Figure 1:
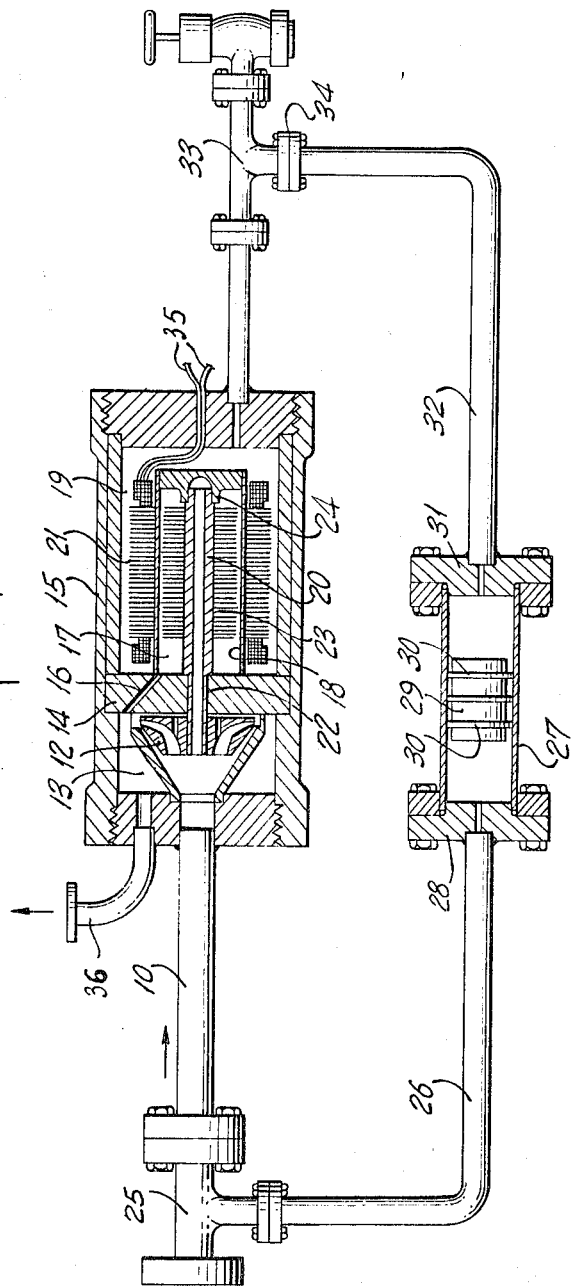

Dec. 6, 1966   F. BACH   3,289,595
HIGH PRESSURE CANNED MOTOR PUMP
Filed Aug. 20, 1965

INVENTOR
FRIEDRICH BACH

United States Patent Office 3,289,595
Patented Dec. 6, 1966

3,289,595
HIGH PRESSURE CANNED MOTOR PUMP
Friedrich Bach, Leuna, Kreis Merseburg, Germany, assignor to Veb Leuna-Werke "Walter Ulbricht," Leuna, Kreis Merseburg, Germany
Filed Aug. 20, 1965, Ser. No. 481,161
5 Claims. (Cl. 103—87)

This invention relates to a hermetically sealed high-pressure canned motor pump unit in which the entire motor pump unit is rigidly mounted in a pressure-resistant casing.

Canned motor pumps are becoming increasingly important in all branches of industry in which pumps are used. As canned motor pumps require no stuffing boxes, these pumps are particularly suitable for delivering toxic or combustible liquids.

Drive is supplied to the pump by a canned motor, that is, an electric motor in which the winding carrying stator is separated from the rotor by a sleeve of non-magnetic, corrosion-resistant material, which is tightly connected to the pump casing. The lubrication of the pump bearings is effected by the liquid being pumped. To achieve this lubrication, a portion of the liquid being pumped is taken from the pressure side of the pump and fed through a corresponding pipe into the interior of the sleeve, i.e., into the rotor compartment. This liquid flows both through the bearing near the pump and over the rotor and through the bearing remote of the pump. There it is once again returned to the suction side.

To maintain electrical losses at a minimum in a canned motor, the wall thickness of the sleeve must not exceed a relatively low value. Such thin wall sleeves, however can only withstand a limited internal pressure. Therefore, it becomes necessary to externally support the sleeve, if the motor pump unit is to be exposed to higher pressures. It is already known to provide mechanical supports to the sleeve such that the portions of the sleeve projecting beyond the end portion of the stator are provided with cylindrical rings. This, however, makes the pump larger and more complicated.

It is also known to eliminate these disadvantages of a high-pressure canned motor pump unit, by supporting the sleeves thereof by hydraulic means by designing the pump and the motor so that the pressure on both sides of the sleeve is equal.

It is further known to fill the stator compartment of a canned motor pump unit mounted in a pressure-resistant casing with an insulating liquid, and, in order to obtain equal pressures, to arrange a pipe disposed external to the pump casing which pipe is connected through a piston or a diaphragm with the high-pressure system to which the pump is connected. In this construction a portion of the liquid to be delivered by the pump flows through the rotor compartment, which is hermetically separated from the stator compartment by the sleeve, and is returned to the suction side of the pump.

It is also known in the art to design the entire motor pump unit, including the rotor and the stator, as a movable piston which in turn acts on the insulating liquid in sides of the sleeve so that the pump pressure acts upon the piston which in turn acts on the insulating liquid in the stator compartment.

I was, however, found that damage is caused to the sleeve by the pressure variations in the high-pressure systems, which occur under the pump arrangements described in the previous paragraphs due to the inertial forces produced by these pressure variations or, in the last mentioned case, due to the friction forces produced by the self-sealing packings of the said piston. The damages occur more often as the diameter of the sleeve increases, with the result that the operation of the pump is no longer reliable when the diameter of the sleeve exceeds a certain dimension.

It is, therefore, an object of this invention to overcome the above disadvantages associated mainly with the pressure balance on both sides of the sleeve in prior art canned motor pump units.

It is a further object of this invention to develop a canned motor pump unit in which the pressure variations in the high-pressure system to which the pump is connected, do not damage the sleeve which damage would render the pump inoperable.

A canned motor pump unit constructed according to this invention is rigidly mounted in pressure-resistant casing means, the casing means comprising means for producing a pressure acting on the liquid contained in the stator compartment of the motor, said pressure being by about 100 atmospheres less than the pressure in the rotor compartment of the motor.

The pressure producing means comprises pressure resistant pipe which connects the stator compartment of the canned motor with the suction side of the pump and which transmits the lower pressure of the suction side to the stator compartment.

In order to prevent corrosion in the stator compartment when delivering corrosive liquids, an intermediate member, preferably a piston or diaphragm, is disposed in this pipe, which permits pressure transmission and which simultaneously prevents mixing of the liquid to be delivered with the insulating liquid contained in the stator compartment.

Figure 2:
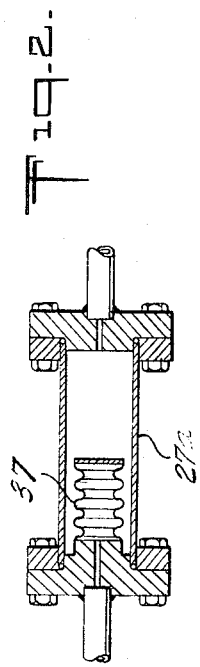

Further objects and features of this invention will become more clearly understood from the following description studied in conjunction with the accompanying drawings, in which FIG. 1 is a view partly in section of the motor pump unit embodying principles of this invention; and FIG. 2 is a view partly in section of a bellows-type embodiment of the pressure balancing means in accordance with the principles of this invention and which may be employed in connection with the motor pump unit of FIG. 1.

Referring now to FIG. 1, a liquid which is under a pressure of approximately 200 atmospheres is sucked in through suction pipe 10 by means of the pump impeller 12 which is part of a conventional canned motor pump installed in the casing 15. This pump is well known in the art and thus need not be further described in this disclosure. The pump unit is firmly anchored in the pressure resistant casing 15 by means of mounting support 14. An electric motor 21, which receives electrical energy from an external source (not shown) through conductors 35, is separated from the pump chamber 13 by the mounting support, and drives a shaft 20 which drives the pump.

The pressure of the liquid being sucked through the suction pipe 10 is increased by the pump to about 206 atmospheres, for example, under which pressure the liquid is delivered into the pressure pipe 36. A portion of the liquid being pumped enters through aperture 16 in the mounting support 14 and enters the rotor compartment 17 of motor 21. The rotor compartment 17 is separated from the stator compartment 19 by the sleeve 18. The portion of liquid which enters the rotor compartment returns through bearing 22 and over the rotor 23, bearing 24, and the hollow pump shaft 20 to the suction side of the pump. Suction pipe 10 is connected through a T-section 25 to a pipe 26 which is in turn connected to cylinder 27 by a connector 28. Within cylinder 27 is located piston 29 which moves within the cylinder. Piston rings 30 surround piston 29 providing a liquid seal in the cylinder. This seal prevents mixing of the pumped liquid with the liquid in the stator compartment. The other end of the cylinder is connected through connector 31 through pipe 32 which is connected to the stator compartment of the motor through a T-connection 33 connected to pipe 32 by means of mounting flanges 34.

Due to the connection of the suction side through pipes 26 and 32 and the piston 29, to the stator compartment 19, the pressure in the stator compartment 19 will be 200 atmospheres and thus approximately 6 atmospheres lower than the pressure in the rotor compartment 17. If, for example, a leak caused a pressure drop in the high-pressure system to which the pump is connected, a period of time will elapse, due to the pressure difference between the stator and the rotor compartments until the pressure difference will become so great as to cause damage to the sleeve. However, during this time the pressure variation caused by the pressure drop has advanced to the suction side of the pump through the cylinder so that no damage to the sleeve will result under the construction according to this invention.

FIG. 2 illustrates a bellows-type embodiment of the pressure producing means in which a bellows 37 is disposed within the cylinder 27a to transmit the lower pressure of the suction side to the stator compartment while providing a seal against the mixing of the stator liquid and the pumped liquid.

As seen in FIG. 2, the bellows is fixedly connected to one end of the cylinder in a sealed connection, while the other end is free to expand in accordion-type fashion according to the pressure within the cylinder. The effects of the bellows is the same as that of the piston in the embodiment employing the piston.

The amount of pressure differential to be established between the stator and rotor compartments is independent of the system pressure. This differential pressure must equal or exceed the maximum pressure variations that occur in the high-pressure system.

It is to be understood that the embodiments shown represent only two constructions which would produce the desired pressure differential and that the embodiments and pressure differential figures disclosed are shown only for purposes of example. The basic scope of the invention is to be limited not by these examples since various other solutions to produce the desired differential pressure may be arrived at, but by the scope and limitations of the appended claims.

What is claimed is:

1. A hermetically sealed motor pump unit comprising a pressure-resistant casing, a canned motor, a pump for pumping high-pressure fluids, said pump and said motor being disposed in said casing, said motor having a stator compartment and a rotor compartment, means for connecting said rotor compartment to the pressure side of said pump, and means for connecting said stator compartment to the suction side of said pump for producing a pressure differential between said rotor and said stator compartments such that the pressure acting on the stator compartment is lower than the pressure in the rotor compartment.

2. A hermetically sealed motor pump unit as in claim 1, wherein said pressure differential producing means comprise conduit means.

3. A hermetically sealed motor pump unit as recited in claim 2, wherein a cylinder having a piston reciprocably mounted therein is connected into said conduit means intermediate the stator compartment and the suction side of said pump.

4. A hermetically sealed motor pump unit as recited in claim 2, wherein a cylinder comprising a flexible bellows connected at one end thereto is placed within said conduit means.

5. A hermetically sealed motor pump unit as recited in claim 1, wherein said stator compartment contains a fluid other than the fluid being pumped, the pressure acting on the fluid in the stator compartment being by up to 100 atmospheres lower than the pressure in the rotor compartment.

References Cited by the Examiner
UNITED STATES PATENTS

| | | |
|---|---|---|
| 2,011,341 | 8/1935 | Mendenhall et al. |
| 2,218,937 | 10/1940 | Myers et al. |
| 2,682,229 | 6/1954 | Luenberger _____ 103—87 |

ROBERT M. WALKER, *Primary Examiner.*